United States Patent [19]

Menendez et al.

[11] Patent Number: 4,886,648

[45] Date of Patent: Dec. 12, 1989

[54] PROCESS FOR THE RECOVERY OF GERMANIUM FROM SOLUTIONS THAT CONTAIN IT

[75] Inventors: Francisco J. S. Menendez, La Moraleja; Fernando M. S. Menendez, Salinas; Antonio De La Cuadra Herrera, Madrid; Francisco A. Tamargo; Luis P. Lorenzo, both of Salinas; Matias R. Valcarcel, Piedras Blancas; Vicente A. Fernandez, Madrid, all of Spain

[73] Assignee: Asturiana De Zinc, S.A., Madrid, Spain

[21] Appl. No.: 213,182

[22] Filed: Jun. 29, 1988

[30] Foreign Application Priority Data

Jul. 15, 1987 [ES] Spain ................................. 8702072

[51] Int. Cl.$^4$ ............................................. C01G 17/00
[52] U.S. Cl. ...................................... 423/92; 423/89; 423/618

[58] Field of Search ........................... 423/89, 92, 618

[56] References Cited

U.S. PATENT DOCUMENTS 3,455,645 7/1969 Kroes .................................. 423/618
4,389,379 6/1983 Bauer et al. ........................... 423/89

FOREIGN PATENT DOCUMENTS 68540 1/1983 European Pat. Off. ............. 423/92

Primary Examiner—John Doll
Assistant Examiner—Wayne A. Langel
Attorney, Agent, or Firm—Robbins & Laramie

[57] ABSTRACT

Process for the recovery of germanium from solutions that contain it, in particular from solutions diluted by the addition of tartaric acid and extraction with an organic solution of a tertiary amine. In the reextraction with sodium hydroxide there is obtained a concentrate of germanium.

11 Claims, No Drawings

PROCESS FOR THE RECOVERY OF GERMANIUM FROM SOLUTIONS THAT CONTAIN IT

STATE OF THE ART

Although there are known minerals such as argyrodite with 7% of germanium in which Winkler (Ber., 19, 210, 1886) discovered this element, to obtain it these days one starts off with materials where their content barely reaches 0.1%. Such is the case with some zinc concentrates, which at the present time can be considered as an important raw material for this element.

In spite of the low content that germanium reaches in the zinc concentrates, in the metallurgy of this metal the germanium becomes concentrated in specific products of the process (differing according to the type of metallurgy used) making it possible to obtain starting from those products solutions where this element reaches concentrations of more than 0.1 g/l. Strictly speaking these solutions constitute the starting point for the metallurgy of germanium.

Boving and Andre (J. Metals, 10, 659,1958) describe a process which, at least at that time, was carried out by the Belgian company Vieille Montagne consisting in the adjustment of the pH of the solution thereby to obtain, by precipitation, a concentrate with 2 to 3% of germanium from which, by dissolving in hydrochloric acid and subsequent fractional distillation, there was obtained pure germanium tetrachloride. By hydrolysis the tetrachloride was transformed into the oxide and finally, by reducing with hydrogen, the metal was obtained.

The most modern reference of which we have knowledge corresponds to two publications of Hilbert (Erzmetall, 35, 184 and 311, 1982) which describe the recovery of germanium at the electrolytic zinc plant of Bleiberger Bergwerk-Union of Austria by the tannin method which, it seems, is the most commonly accepted industrial process.

The precipitation of germanium by tannin (or tannic acid), starting from weakly acid solutions with a concentration of 0.1 to 0.2 g/l, was discovered by Schoeller (Analyst. 57, 551, 1932) and put into practice as a quantitative analytical process by Davis and Morgan (Analyst. 63, 338, 1938). In 1941 the American Smelting and Refining Co. obtained the first patent (U.S. Pat. No. 2,249,341) for a process similar to that of Vieille-Montagne, but instead of obtaining the precipitate by neutralization it is done using tannin with which the product obtained has a higher concentration of germanium.

The revolution that in the field of extractive metallurgy started in the forties with the introduction of the technique of extraction by solvents, has not been foreign to germanium.

Similar to what has been said about tannin, the route has always been a discovery in the field of analytical chemistry which subsequently research workers have known to apply it to the industrial practice.

From an analytical point of view, different authors have proposed different means of separating germanium from its solutions by means of extraction with solvents. Apart from the utilization of other extractants that in our judgement are difficult to use on an industrial scale, there are three that we would mention as follows:

The first one, in chronological order, is that of the oximes, used for the first time in 1963: RUDENKO N. P. Y KOVTUN 1.V., Tr, Kom. Anal. Khim., 14 209 (1963) (summary in C.A. 59, 13584).

The second one would be the use of the derivatives of 8-hydroxyquinoline on which L. V. KOVTUN and his collaborators have worked, the first work being in 1967: KOVTUN 1.V. and RUDENKO N. F., Zh Neorg. Khim., 12 (11) 3123 (1967) (summary in C.A 68.35943).

The third one refers to the use of amines (secondary, tertiary and quaternary), in this case together with a polyhydroxylate complexant of germanium. In this sense the first of the works published use oxalic acid and pyrocatechol and a tertiary amine, trioctylamine: ANDRIANOV A. M. and AVLASOVICH L. M., Zh. Prikl. Khim. 41, 2313 (1968) (summary in C.A. 70, 23534).

The use of tartaric acid (or as well citric acid) as complexant and trioctylamine as extractant is published for the first time in 1973: POZHARITSKII A. F., BOBROVSKAYA M. N., BELOUSAVA E. M., SKRYLEV L. D. and STRELSOVA E. A., Zh. Neorg. Khim., 18, (9), 2482 (1973) (summary in C.A. 80,7627).

The oximes and the derivatives of 8-hydroxyquinoline have been used industrially, employing products which are found commercially with registered names such as LIX (an oxime of General Mills) and KELEX (an 8-hydroxyquinoline of Ashland Chemical). In this respect it is worth noting the processes of Penarroya and Hoboken protected by European patents:

Penarroya is the proprietor of European Patent No. 0046437 of 17.08.81 (priority 15.8.80 U.S. Pat. No. 178,583) and Hoboken of No. 0068541 of 04.06.82 (priority 28.06.81 LU 83448).

One must mention, nevertheless, a first German patent of Hoboken of 14.05.73 (Ger. Offen. No. 2,423,355) and another later American patent (U.S. Pat. No. 3,883,634) of 26.04.74 which are superseded by the above mentioned ones.

Both processes have been described in the scientific bibliography in the respective works of Cote and Bauer (Hydrometallurgy, 5, 149, 1980) and of De Schepper (Hydrometallurgy, 1. 291, 1975) which we will summarise as follows, due to the fact that, in our judgement, they mark the state of the art in this field:

In the first work there is utilised, as mentioned above, an 8-hydroxyquinoline (Kelex-100) as a 4% solution in kerosene, to which solution is added, to avoid the formation of a third phase, 10% of octanol as modifier. With the solution, using a mixing time of 10 mins, the germanium contained in an aqueous solution is extracted with sulphuric acid of 150 g/l. After a stage of washing with water a re-extraction is performed where, after maintaining the organic phase in contact with a 3N solution of sodium hydroxide during 190 mins and agitating for 10 mins, there is obtained a solution with 24.3 g/l of germanium practically free of zinc (1 mg/l).

In the work of De Schepper there is used a solution of LIX-63 up to 50% in kerosene to extract germanium from solution with sulphuric acid of 110 g/l. The mixing time is reduced to 4 minutes, a stage of washing with water also exists and the re-extraction is realised with an aqueous solution of 110 g/l of sodium hydroxide, obtaining a concentrate of germanium with 38 g/l of this element. Although in the publication the temperature is not mentioned, in the two patents there is emphasised the importance of carrying out this operation at a higher temperature than 45° C., preferably at 60° C., whilst for the extraction it is convenient to work at the lowest possible temperature. The organic, before being re-used requires a treatment of regeneration with concentrated sulphuric acid (132 g/l). By neutralisation to a pH of 9 to 10 with the acid used in the regeneration, there is precipitated, according to De Schepper, a hydrated oxide of germanium which once dried has 50% of this element approximately.

DESCRIPTION OF THE INVENTION

The utilisation of amines, cheaper and more manageable extractants than the previous ones, has not been employed yet on an industrial scale due, possibly, to the necessity to use a complexant of germanium (oxalic, tartaric, citric, etc) which would make the process, with respect to other extractants, disproportionally more expensive and entail the introduction of an extraneous element into the resulting solution.

The process which is the object of the present patent permits one, with a minimum use of complexant, to perform the extraction of germanium from weakly acid solutions using amines, recovering the germanium extracted in the form of a crystallised alkaline polygermanate with a very low content of impurities and contaminants. This polygermanate, in turn, is easily transformed into a commercial oxide, as will be show further on.

Although from now on we will refer exclusively to tartaric acid as a complexant, being in our judgement the most economical, any other hydroxycarboxylic acid can be used or oxalic acid. Equally, as an extractant agent we will refer to tertiary amines with 8-10 carbon atoms in their alkyl radicals, although that does not imply, either, that it is not possible to utilise secondary amines or quaternary ammonium salts. As commercial tertiary amines there are useable, for example, those that correspond to the registered names ALAMINE 336 (General Mils), ADOGEN 364 (Ashland Chemical) and HOSTAREX A-327 (Hoech.)

The process consists in the extraction of germanium from a weakly acid solution (at a pH between 0.8 and 1.3) to which 2.15 kg of tartaric acid have been added per kg of contained germanium, tartaric that comes, partly, from that used in a previous operation which is reutilised as will be explained later. The solution is put in contact at room temperature in countercurrent, in a battery of mixer-settlers apparatus (or alternative adequate device), with an organic solution of an amine (the most appropriate is a 3% by volume solution of the amine in kerosene); in this way, there is obtained a refined product practically free of germanium and an organic extract loaded with this element. After a washing stage of the organic extract at room temperature with water, in order to prevent the salts that accompanied the germanium in the fertile liquid from reaching the stage of reextraction, this reextraction stage takes place. In this stage, the organic extract is newly contacted, at room temperature and in countercurrent, with a solution of sodium hydroxide with a concentration of some 180 g/l, to obtain a concentrate of germanium with a content of this element of 20 to 25 g/l, the organic solution remaining, free of germanium, ready for new utilisation.

This germanium concentrate, at a pH higher than 12, is slowly neutralised with heating with concentrated sulphuric acid until there is reached a pH between 8 and 11 at which there is maximum insolubility of sodium polygermanate. The majority of the germanium is separated from the solution in this way, the remaining mother waters containing a low content of germanium and practically all the tartaric acid used. This, when acting only as a vehicle for the transportation of germanium, should only be consumed by the excess to be used over the stoichiometric in order to displace the equilibrium of formation of the complex and in which logically it is lost with the precipitate.

Although by increasing the concentration of sodium hydroxide, solutions can be obtained with nearly 40 g/l of germanium, this is not convenient because as a consequence after lowering the pH with sulphuric acid, a high concentration of sulphates are obtained which act disfavourably in the precipitation of germanium. The concentration of soda and the volume of the reextraction solution must be adjusted in order to obtain in the concentrate from 20 to 25 g/l of Ge.

Due to the small volume of the obtained solution (including the washing water) compared with that of the fertile liquid, this reutilisation of tartaric acid and the utilisation of the non-precipitated germanium, does not affect noticeably the dimensions of the equipment nor the efficiency of the operation.

The transformation of the germanate into germanium oxide takes place as per the reaction:

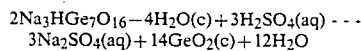

$$2Na_3HGe_7O_{16} \cdot 4H_2O(c) + 3H_2SO_4(aq) \rightarrow 3Na_2SO_4(aq) + 14GeO_2(c) + 12H_2O$$

in which using an excess of acid, germanium dioxide is formed in its tetragonal variety, practically insoluble, whilst the rest of the impurities (Na, Fe, Zn, etc), remain in solution, given the solubility of the sulphates. The low solubility of germanium oxide allows its washing without major losses of germanium. In any case, the acid solution can be used in preparing a new fertile solution thus taking advantage of the small quantities of germanium that can be contained.

The process details which will be given in the following examples, can be summarised in the following way:

Germanium forms with various carboxylic acids, especially with tartaric acid, a stable complex in a weakly acid medium (whilst the majority of the metallic cations form this stable complex in a neutral or alkaline medium). The complex is extractable, in a practically selective manner by the organic amines, especially by the tertiary and quaternary amines (but the latter are more expensive and present problems of a physical nature—formation of emulsions—that are not advisable).

Due to the fact that the germanium tartaric complex is unstable (or at least it is transformed into another one not extractable by the amine) when changing the medium of the aqueous phase from acid to alkaline, the distribution coefficient changes so abruptly that one extraction stage only should be sufficient for the germanium of the organic phase to pass into the aqueous phase.

Acidifying, to pH 10, the obtained alkaline solution precipitates the major part of the germanium as sodium polygermanate and the tartaric acid that was used in complexing the extracted germanium remains in solution. Due to the fact that the volume of the resulting solution is of the order of 1/50 of the volume of the fertile solution, the tartaric acid recovered can be used again without noticeably diluting tha solution.

Facing the necessity to use a partially consumable reactant (tartaric acid), because more than 75% is recovered, this has a series of advantages over those presently existing methods of extraction with oximes or hydroquinolines, which we demonstrate:

(a) the extractant (amine) is cheaper
(b) the extractant is utilised in very low concentration.
(c) the organic phase is much more fluid which avoids the hydrodynamic problems and those of mixing.
(d) the contact times (residence time) are much smaller, especially in the reextraction.
(e) the extraction as well as the reextraction can be achieved at room temperature.
(f) it is not necessary to use any stage of regeneration of the amine.
(g) the only extractable ion in a noticeable quantity is bisulphate ($HSO_4^-$). Because the acidity is very low, the extracted quantity of bisulphate is also very low.
(h) the acidity necessary to reach the optimum pH (some 7 g/l of sulphuric acid compared with the high values of other processes) does not entail any problem nor major expense in the later utilization of the refined product (solution from which the germanium has been extracted).

DETAILED DESCRIPTION OF THE PERFORMANCE OF THE PROCESS

In continuation and by way of example, there is shown the behaviour of the two solutions in this treatment:

EXAMPLE NO. 1

Fertile solution:
Germanium . . . 1.5 gl
$Fe^{2+}$ . . . 8.3 g/l
$Fe^{3+}$ . . . not detected
Cu . . . 0.035 g/l
Al . . . 6.8 g/l
Zn . . . 3.9 g/l
Organic Solution
Adogen 364 . . . 30 cc
Kerosene . . . up to 1000 cc
Alkaline Solution
Sodium Hydroxide . . . 180 g
Water . . . up to 1000 c
Tartaric Solution (mother water and washing water):
Germanium . . . 2.0 g/l
Tartrate . . . 25.4 g/l (as tartaric acid)
Water . . . up to 1000 cc
Aqueous Solution:
It is prepared by mixing 1000 cc of the fertile solution with 100 cc of the tartaric solution and 0.73 g of tartaric acid.

We proceed to the batchwise extraction in countercurrent of the germanium from the aqueous solution with the organic solution using three stages in each one agitating 250 cc of the aqueous solution with 500 cc of the organic solution, using a mixing time of 2 minutes and leaving to rest long enough for the separation of the phases. Every 500 cc of loaded organic is washed with 45 cc of water which once separated from the organic phase is mixed with the 250 cc of the aqueous solution to be treated. The organic extract is reextracted in countercurrent in three stages with the alkaline solution using 16 cc for each 500 cc of organic.

Refined Product: Ge=0.07 g/l
Concentrated Product: Ge=19.5 g/l

When 750 cc of germanium concentrate have been obtained, this is heated to 70°-80° C. and there is added, drop by drop, using a time of some 2 hours, concentrated sulphuric acid to a pH of 10.5 and after leaving 1 hour with agitation one proceeds to filter the obtained precipitate, which is washed bringing the washing waters together with the filtrate to obtain a volume of 1000 cc substituting this solution for the spent tartaric solution.

EXAMPLE NO. b 2

Fertile Solution:
Germanium . . . 0.45 g/l
$Fe^{2+}$ . . . 8.0 g/l
$Fe^{3+}$ . . . not detected
Cu . . . not detected
Zn . . . 108.0 g/l
Al . . . 4.0 g/l
pH . . . 1.0
Organic Solution
Hostarex A-327 . . . 30 cc
Tributyl Phosphate . . . 30 cc
Kerosene . . . up to 1000 cc
Alkaline Solution
Sodium Hydroxide . . . 200 g
Water . . . up to 1000 cc The operation is performed continuously using two mixer-settler batteries of four stages, and a mixer-settler for the washing.

Initially the fertile solution is charged adding 1 kg of tartaric acid per $m^3$ of solution. The flow of organic solution is adjusted to a volumetric relation O/A between 0.8 and 1. The flow of washing water is adjusted to 1/10 of the flow of the feed and the flow of the alkaline solution to 1/50 of the flow of the feed. The resulting washing solution is joined to the feed solution. In this way the following is obtained:

Germanium in refined product . . . 0.02 g/l
Germanium in concentrated product . . . 20 g/l.

The germanium content of this solution is precipitated after being heated to 70° C., by adding concentrated sulphuric acid until the pH is lowered to a value of 10. The obtained slurry is filtered and washed with water to obtain a volume of approximately 1/30 of the original fertile solution, this volume being mixed with a new fertile solution.

The invention being thus described, it will be obvious that the same may be varied in many ways. Such variations are not to be regarded as a departure from the spirit of scope of the invention and all such modifications are intended to be included within the scape of the claims.

We claim:
1. A process for the recovery of germanium from an aqueous acidic solution containing germanium comprising;
   (a) adding polyhydrocarboxylic compound, as a complexing agent for germanium, to said aqueous acidic solution forming an aqueous liquor; and liquid-liquid extracting the formed complex by contacting, at a temperature in the range of 15° to 40° C., the aqueous liquor with an organic solution, said organic solution comprising a water-immiscible organic diluent and an amine extractant, to thereby form an organic extract rich in germanium complex and an aqueous phase practically free of germanium;
   (b) scrubbing with water said organic extract rich in germanium complex;
   (c) treating said organic extract rich in germanium complex with an aqueous basic solution at a tem- perature in the range of 15° C. to 40° C. to thereby dissociate the germanium complex and thereby transfer the polyhydroxycarboxylic compound and germanium as polygermanate, to the aqueous phase, and obtaining an organic solution practically free of both germanium and complexing agent wherein said organic solution practically free of germanium and complexing agent is ready to be used in step (a); and (d) adding sulphuric acid to the basic aqueous solution product of step (c) to bring the pH value into the range of 8 to 11 to thereby precipitate germanium in the form of polygermanate out of the aqueous solution whereby the precipitate-free aqueous solution containing said complexing agent is available to be used again in step (a).

2. A process according to claim 1 wherein said amine is a trialkylamine with 8 to 10 carbon atoms in each alkyl group; wherein said diluent is kerosene, and wherein the concentration of said amine in said organic solution of step (a) is in the range of 1.5% to 5% by volume.

3. A process according to claim 1 wherein said complexing agent is tartaric acid, and wherein the amount of said tartaric acid which is added in step (a) is at least 2.15 kg of tartaric acid per kg of germanium contained in the aqueous acidic solution of step (a).

4. A process according to claim 1 wherein the concentration of germanium in the organic phase of step (a) is not higher than 1.5 g/l.

5. A process according to claim 1 wherein tributyl phosphate is added, as modifier, to the organic solution of step (a), in a concentration in the range of 1 to 3% by volume, in order to avoid the formation of a third phase.

6. A process according to claim 1 wherein the acidity of the aqueous acidic solution of step (a) is adjusting with sulphuric acid to a pH value in the range of 0.5 to 2.

7. A process according to claim 1 wherein the aqueous solution resulting from the scrubbing step (b) is recycled to step (a).

8. A process according to claim 1 wherein said basic aqueous solution, used in step (c), the stripping step, is a sodium hydroxide solution with a NaOH concentration in the range of 1 to 5N and wherein stripping step (c) takes place at a temperature in the range of 15° C. to 40° C.

9. A process according to claim 1 wherein said organic phase practically free of germanium obtained in step (c) is recycled to step (a).

10. A process according to claim 1 wherein said precipitate-free aqueous phase containing complexing agent of step (d) is recycled to step (a).

11. A process according to claim 1 wherein the recovery of the complexing agent of step (d) is carried out at a temperature higher than 60° C.

* * * * *